US012735334B2

(12) United States Patent
Wang et al.

(10) Patent No.: US 12,735,334 B2
(45) Date of Patent: Sep. 15, 2026

(54) OIL-WATER MIXTURE TREATMENT DEVICE AND METHOD

(71) Applicants: CHINA PETROLEUM & CHEMICAL CORPORATION, Beijing (CN); SINOPEC EXPLORATION & PRODUCTION RESEARCH INSTITUTE, Beijing (CN)

(72) Inventors: Lili Wang, Beijing (CN); Wei Dang, Beijing (CN); Pengyuan Ding, Beijing (CN); Changchao Hu, Beijing (CN); Caixia Bi, Beijing (CN); Zhiwei Tang, Beijing (CN); Wenjie Tan, Beijing (CN); Xingwang Wang, Beijing (CN); Yanxiao Si, Beijing (CN)

(73) Assignees: CHINA PETROLEUM & CHEMICAL CORPORATION, Beijing (CN); SINOPEC EXPLORATION & PRODUCTION RESEARCH INSTITUTE, Beijing (CN)

( * ) Notice: Subject to any disclaimer, the term of this patent is extended or adjusted under 35 U.S.C. 154(b) by 352 days.

(21) Appl. No.: 18/573,605

(22) PCT Filed: Sep. 29, 2021

(86) PCT No.: PCT/CN2021/121827

§ 371 (c)(1),
(2) Date: Dec. 22, 2023

(87) PCT Pub. No.: WO2023/279553

PCT Pub. Date: Jan. 12, 2023

(65) Prior Publication Data

US 2024/0300832 A1 Sep. 12, 2024

(30) Foreign Application Priority Data

Jul. 7, 2021 (CN) ........................ 202110769487.X

(51) Int. Cl.
*C02F 1/40* (2023.01)
*C02F 1/00* (2023.01)
(Continued)

(52) U.S. Cl.
CPC ................ *C02F 1/40* (2013.01); *C02F 1/385* (2013.01); *C02F 1/48* (2013.01); *C02F 1/52* (2013.01);
(Continued)

(58) Field of Classification Search
CPC .... C02F 1/40; C02F 1/385; C02F 1/48; C02F 1/52; C02F 1/66; C02F 2001/007;
(Continued)

(56) References Cited

U.S. PATENT DOCUMENTS 5,565,078 A 10/1996 Sams et al.
2003/0226802 A1 12/2003 Benson
(Continued)

FOREIGN PATENT DOCUMENTS

CN 2338072 Y 9/1999
CN 2741633 Y 11/2005
(Continued)

*Primary Examiner* — Madeline Gonzalez
(74) *Attorney, Agent, or Firm* — NKL Law; Allen Xue

(57) ABSTRACT

An oil-water mixture treatment device has a laminar separator and an electric field separator. The laminar separator has a coalescing tube with coalescing filler provided therein, a separating tube arranged above the coalescing tube, and a discharging tube arranged above the separating tube. The coalescing tube is connected to said separating tube by a first connecting tube group and the separating tube is connected to the discharging tube by a second connecting tube group.
(Continued)

The oil-water mixture to be treated enters, after being treated in the coalescing tube, the separating tube through the first connecting tube group for laminar separation. The resulting oil phase enters the discharging tube through the second connecting tube group and then is discharged through an oil discharge pipeline, while the resulting water phase enters the electric field separator from a lower portion of the separating tube for a next stage of separation.

20 Claims, 3 Drawing Sheets

(51) Int. Cl.
*C02F 1/38* (2023.01)
*C02F 1/48* (2023.01)
*C02F 1/52* (2023.01)
*C02F 1/66* (2023.01)

(52) U.S. Cl.
CPC .......... *C02F 1/66* (2013.01); *C02F 2001/007* (2013.01); *C02F 2201/48* (2013.01); *C02F 2209/06* (2013.01); *C02F 2209/10* (2013.01); *C02F 2209/44* (2013.01); *C02F 2301/026* (2013.01)

(58) Field of Classification Search
CPC .............. C02F 2201/48; C02F 2209/06; C02F 2209/10; C02F 2209/44; C02F 2301/026; C02F 1/00; C02F 1/463; C02F 9/00; B01D 17/00; B01D 17/02
USPC ........ 210/748.01, 195.1, 200–203, 243, 252, 210/259, 260, 322, 512.1, 512.2, DIG. 5, 210/304
See application file for complete search history.

(56) References Cited

U.S. PATENT DOCUMENTS

2014/0158514 A1 6/2014 Govind et al.
2015/0114838 A1 4/2015 Sivaramakrishnan et al.
2015/0182878 A1 7/2015 Bultinck et al.
2016/0317950 A1* 11/2016 Dang ................. B01D 17/0217
2018/0002212 A1 1/2018 Englram

FOREIGN PATENT DOCUMENTS

CN 102500137 A 6/2012
CN 202643456 U 1/2013
CN 203269667 U 11/2013
CN 103773428 A 5/2014
CN 104671487 A 6/2015
CN 205878278 U 1/2017
CN 106517402 A 3/2017
CN 106861294 A 6/2017
CN 206359279 U 7/2017
CN 107648884 A 2/2018
CN 108434785 A 8/2018
CN 207861955 U 9/2018
CN 109553166 A 4/2019
CN 209836093 U 12/2019
CN 111686950 A 9/2020
CN 111825174 A 10/2020
CN 111825265 A 10/2020
CN 112520921 A 3/2021
JP 2001137614 A 5/2001
KR 20180133191 A 12/2018
WO 2019204420 A1 10/2019

* cited by examiner 230
261
262
263
22
270
281
282
283
241
23
242
220
21
200
210

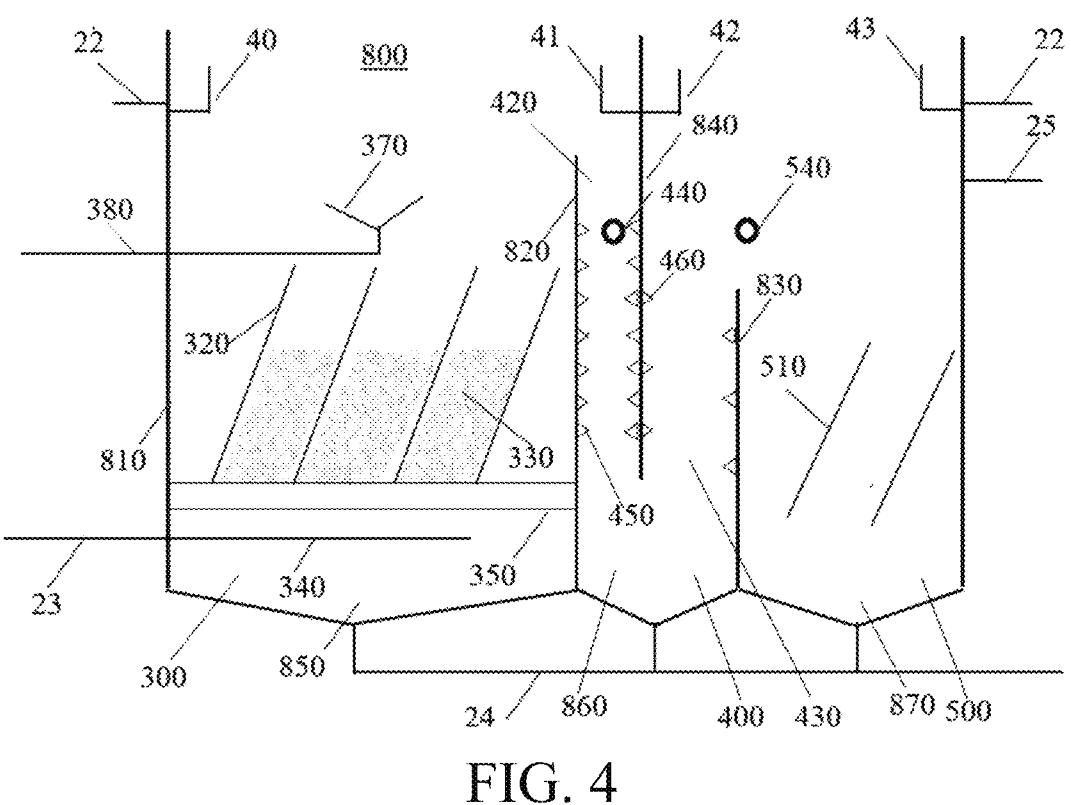
FIG. 4
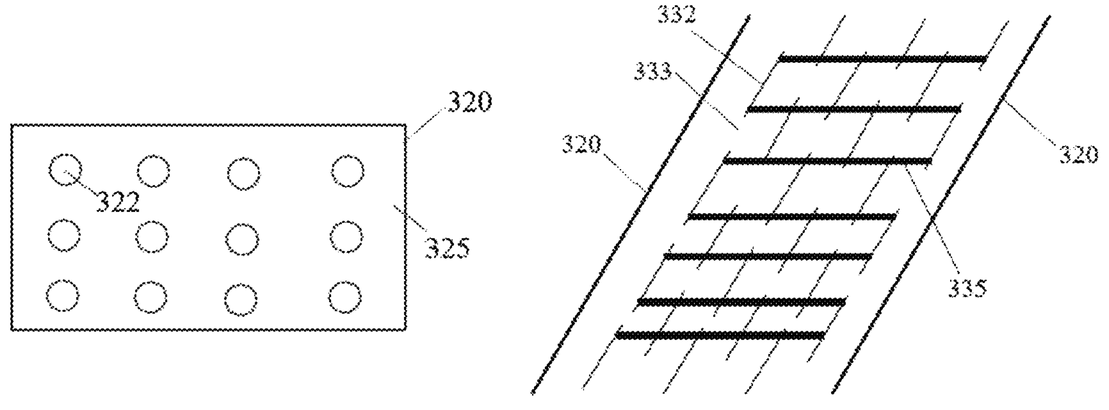
FIG. 5
FIG. 6

OIL-WATER MIXTURE TREATMENT DEVICE AND METHOD

CROSS-REFERENCE OF RELATED APPLICATIONS

This application is a U.S. national stage entry of PCT International Application No. PCT/CN2021/121827, filed on Sep. 29, 2021, which claims the priority of Chinese patent application No. 202110769487.X entitled "Oil-water mixture treatment device and method" and filed on Jul. 7, 2021, the content of which is incorporated herein by reference in its entirety.

TECHNICAL FIELD

The present invention relates to the technical field of water treatment, and in particular to a device for treating oil-water mixture, such as oil-containing wastewater, and a method for treating oil-water mixture.

TECHNICAL BACKGROUND

Oilfield chemical enterprises normally discharge a large amount of oil-containing wastewater. For example, for SINOPEC alone, the output of wastewater from its oilfields reaches $100\times10^4$ $m^3$ per day. Generally speaking, the oil-containing wastewater is heavily emulsified and thus contains a large number of oil droplets and suspended substances with tiny particle sizes. These tiny oil droplets and suspended substances will be stably suspended in the wastewater. The oil-water separation speed is slow, and it is difficult to remove oil from the wastewater.

In order to accelerate the oil-water separation, in the prior arts it is generally necessary to add a variety of agents, such as oil-removing agent, flocculating agent or flotation agent, coagulant aid or the like, with an amount ranging from dozens mg/L to 200 mg/L, up to more than 600 mg/L. However, adding a large amount of agents will lead to a series of problems, such as high cost of wastewater treatment, high sludge production, or the like, which brings a heavy burden to the production and operation of the oilfield.

Therefore, in recent years, the treatment of oil-containing wastewater has gradually developed towards the technology of no agent-adding and low sludge yield. CN112520921A discloses an oil-containing wastewater treatment apparatus based on multi-physical field synergistic effect, which includes a preliminary treatment unit and an advanced treatment unit. The preliminary treatment unit includes a cyclone module, a compact micro-air flotation module, a first media aggregation module, and a multi-media filtration module, for removing dispersed oil droplets with relatively large particle sizes. The advanced treatment unit includes an enhanced demulsification module based on dielectric synergistic effect, for removing emulsified oil droplets with relatively small particle sizes.

However, this apparatus is structurally complex, and has a long treatment process and a large footprint, with unsatisfactory treatment results. In particular, the compact micro-air flotation module in this apparatus has high energy consumption, and is not easy to run and operate. Moreover, the air flotation process is prone to corrosion and scaling. In addition, the enhanced demulsification module based on dielectric synergistic effect in this apparatus cannot achieve satisfactory treatment effect, and the cleaning and contamination of the polarity plates are also difficult to handle.

SUMMARY OF THE INVENTION

The present invention aims to propose a device for treating oil-water mixture, and a method for treating oil-water mixture.

According to one aspect of the present invention, an oil-water mixture treatment device is provided, comprising a laminar separator and an electric field separator located downstream of said laminar separator. Said laminar separator comprises a coalescing tube with coalescing filler therein, a separating tube arranged above said coalescing tube, and a discharging tube arranged above said separating tube. Said coalescing tube, said separating tube and said discharging tube are arranged substantially parallel with and spaced apart from each other, said coalescing tube being connected to said separating tube by a first connecting tube group and said separating tube being connected to said discharging tube by a second connecting tube group. Oil-water mixture to be treated enters, after treated in said coalescing tube, said separating tube through said first connecting tube group for laminar separation, and oil phase separated enters into said discharging tube through said second connecting tube group and then is discharged from an upper portion of said discharging tube through an oil discharge pipeline, while water phase separated enters into said electric field separator from a lower portion of said separating tube for a next stage of separation.

In a preferred embodiment, each first connecting tube in said first connecting tube group and each second connecting tube in said second connecting tube group are arranged with each other in a staggered manner along a flow direction of the oil-water mixture.

In a preferred embodiment, said coalescing tube, said separating tube and said discharging tube are all arranged in a spiral pattern. Preferably, a length of said coalescing tube is 20%-100% of that of said separating tube, and a length of said discharging tube is the same as that of said separating tube.

In a preferred embodiment, said electric field separator comprises a plurality of electrode plates arranged substantially parallel with and spaced apart from each other, with a coalescing unit disposed between two adjacent electrode plates, wherein said electrode plates are arranged obliquely in a direction that is at an acute angle to the flow direction of the oil-water mixture.

In a preferred embodiment, a surface of each electrode plate comprises a number of dot-like oleophilic zones, and other parts of the surface of said electrode plate are oleophobic zones.

In a specific embodiment, said dot-like oleophilic zones each have a diameter of 1-50 mm, and a total area of said dot-like oleophilic zones accounts for 10%-50% of an area of an entire electrode plate.

In a preferred embodiment, said coalescing unit comprises a plurality of coalescing plates extending substantially parallel to said electrode plate, said coalescing plates being connected together to form a unitary body through a plurality of connecting rods.

In a preferred embodiment, each coalescing plate is provided with a plurality of openings, each opening in each coalescing plate being staggered relative to openings in adjacent coalescing plates.

In a preferred embodiment, said electric field separator comprises a carrier plate, on which said electrode plates are provided, and a backwash pipe is further provided above said electrode plates, and has an end provided with a flaring outlet facing a center of said electrode plates.

In a preferred embodiment, said device further comprises an agent-adding separator and a physical settler, wherein said electric field separator, said agent-adding separator and said physical settler are integrated in a housing, in which a first partition and a second partition are arranged to divide an internal space of said housing into three regions, so that said electric field separator, said agent-adding separator and said physical settler are arranged in said three regions, respectively, in order to treat the oil-water mixture in sequence.

In a preferred embodiment, said agent-adding separator is separated into an upstream coagulation zone and a downstream flocculation zone by means of a third partition, said coagulation zone and said flocculation zone being in communication with each other at a bottom of said agent-adding separator.

In a preferred embodiment, a pH value of the oil-water mixture is adjusted to above 8 by adding agent in said coagulation zone, wherein said agent contains coagulation aid for a content of suspended matter below 25 mg/L.

In a preferred embodiment, a first group of folded plates is mounted in said coagulation zone in form of heterogeneous folded plate, and a second group of folded plates is mounted in said flocculation zone in form of homogeneous folded plate.

In a preferred embodiment, said electric field separator, said agent-adding separator and said physical settler are each provided with a sludge collecting section at a bottom thereof and with an oil collecting tank at a top thereof.

In a preferred embodiment, said oil-water mixture treatment device further comprises a cyclone separator provided upstream of said laminar separator, and a filter provided downstream of said physical settler.

According to another aspect of the present invention, a method for treating an oil-water mixture using the oil-water mixture treatment device is provided.

In a preferred embodiment, polarity of each electrode plate in said electric field separator is periodically changed with a period of 2-24 h.

In a preferred embodiment, the oil-water mixture to be treated is allowed to enter said laminar separator directly without passing through said cyclone separator when having an oil content less than 3,000 mg/L.

In a preferred embodiment, the oil-water mixture to be treated is allowed to enter said physical settler directly from said electric field separator when having a total content of iron less than 0.5 mg/L.

In a preferred embodiment, the oil-water mixture to be treated is allowed to enter said filter directly from said electric field separator when having a total content of iron less than 0.5 mg/L and a content of suspended matter less than 50 mg/L.

In a preferred embodiment, the oil-water mixture to be treated is allowed to drain out without passing through said filter when meeting water quality standard.

BRIEF DESCRIPTION OF THE DRAWINGS

In the following the present invention will be described in detail with reference to the accompanying drawings. In the drawings:

FIG. 4 schematically shows an overall structure of a comprehensive treatment unit in the device as shown in FIG. 1, comprising an electric field separator, an agent-adding separator and a physical settler;

FIG. 5 schematically shows a plan view of an electrode plate in the electric field separator according to the present invention; and FIG. 6 schematically shows a structure of a coalescing unit in the electric field separator according to the present invention.

In the drawings, the same reference numerals are used to indicate the same components. The drawings are not necessarily drawn to actual scales, and some portions in the drawings have been deliberately enlarged in order to show necessary details.

DETAILED DESCRIPTION OF EMBODIMENTS

The present invention will be further described below with reference to the accompanying drawings. In the context of the present invention, directional terms "upstream", "downstream" or the like are defined according to the flow direction of the fluid to be treated.

Figure 1:
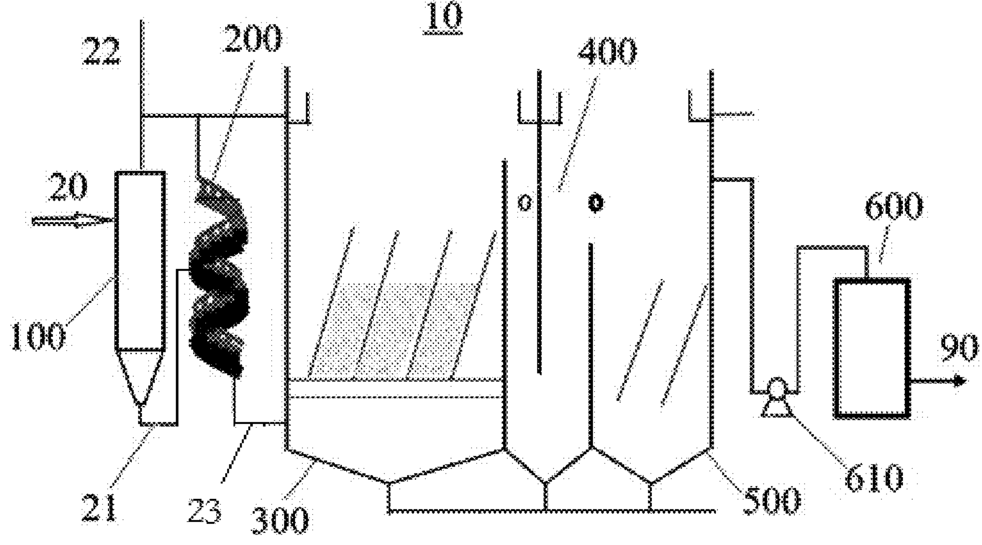
FIG. 1 schematically shows an overall structure of an oil-water mixture treatment device according to the present invention.

FIG. 1 shows an oil-water mixture treatment device 10 according to the present invention, which is intended for treating oil-containing wastewater or oilfield produced fluid. However, it can be understood that the oil-water mixture treatment device 10 according to the present invention may also be used for treating other oil-water mixtures, such as municipal sewage.

As shown in FIG. 1, the oil-water mixture treatment device 10 according to the present invention receives oil-containing wastewater through a pipeline 20, which is schematically shown by an arrow. In the oil-water mixture treatment device 10 according to the present invention, the oil-containing wastewater flows through a cyclone separator 100, a laminar separator 200, an electric field separator 300, an agent-adding separator 400, a physical settler 500, and a filter 600 in sequence, for stage-by-stage treatment. Finally, the purified water is discharged from the entire device via a drain pipeline 90.

In the following, the various components of the oil-water mixture treatment device 10 according to the present invention will be described in detail.

The cyclone separator 100 of the oil-water mixture treatment device 10 according to the present invention may be any cyclone separator known in the field, for preliminary oil-water separation of the oil-containing wastewater. The oil phase in the oil-containing wastewater separated by the cyclone separator 100 is discharged through an oil discharge pipeline 22 arranged in an upper portion of the cyclone separator 100, while the water phase in the oil-containing wastewater separated by the cyclone separator 100 enters into the laminar separator 200 through a first pipeline 21 arranged in a lower portion of the cyclone separator 100, in order to receive a next stage of treatment. For convenience, in the context, the oil-containing wastewater having been treated by the cyclone separator 100 is referred to as a primary treatment fluid, the oil-containing wastewater having been treated by the laminar separator 200 is referred to as a secondary treatment fluid, and so on.

Figures 2, 3:
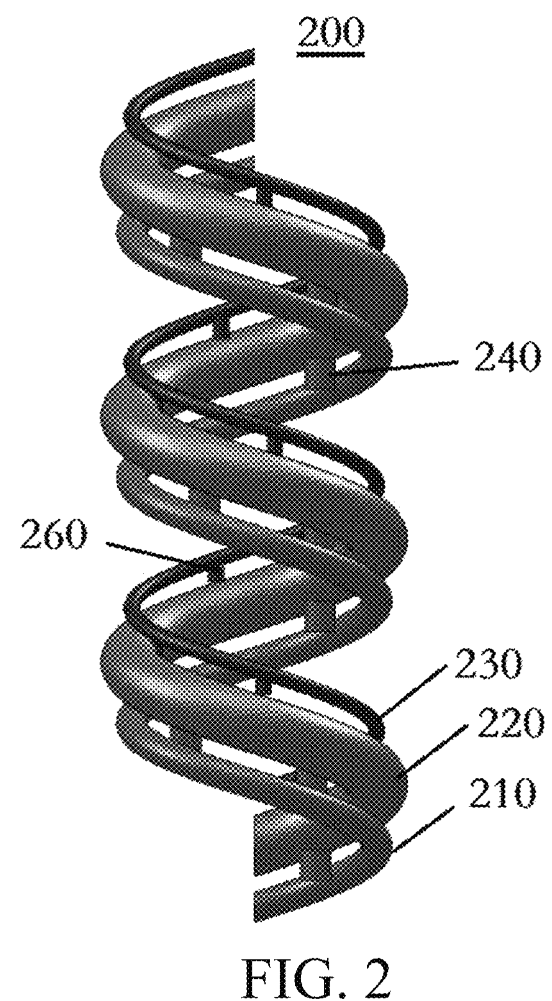
FIG. 2 schematically shows a vertical structure of a laminar separator in the device as shown in FIG. 1.
FIG. 3 schematically shows a planar developed structure of the laminar separator in the device as shown in FIG. 1.

FIGS. 2 and 3 schematically show a vertical structure and a planar developed structure of the laminar separator 200, respectively, in the device shown in FIG. 1. As shown in FIGS. 2 and 3, the primary treatment fluid from the cyclone separator 100 enters the laminar separator 200 via the first pipeline 21. The laminar separator 200 includes a coalescing tube 210, a separating tube 220, and a discharging tube 230, which are arranged in sequence along a vertical direction from bottom to top. The coalescing tube 210, the separating tube 220 and the discharging tube 230 are arranged substantially parallel with and spaced apart from each other.

According to the present invention, a first connecting tube group 240 is provided between the coalescing tube 210 and the separating tube 220, thereby connecting the coalescing tube 210 and the separating tube 220 to each other. Similarly, a second connecting tube group 260 is provided between the separating tube 220 and the discharging tube 230, thereby connecting the separating tube 220 and the discharging tube 230 to each other. Each of the first connecting tube group 240 and the second connecting tube group 260 consists of a plurality of connecting tubes extending vertically.

As shown in FIG. 3, the primary treatment fluid enters the coalescing tube 210 of the laminar separator 200 via the first pipeline 21. Coalescing filler (schematically shown by deep color in FIG. 3) is provided in the coalescing tube 210. As a result, fine oil droplets in the primary treatment fluid will collide and agglomerate on the surface of the coalescing filler, thereby growing to become large oil droplets. Thus de-emulsification can be gradually achieved as the primary treatment fluid flows through the coalescing tube 210. The de-emulsified oil droplets float up to an upper part of the coalescing filler, and gradually enter the separating tube 220 through first connecting tubes in the first connecting tube group 240. For the sake of clarity, only one tube section 270 arranged between the coalescing pipe 210 and the separating pipe 220, and two first connecting tubes 241, 242 of the first connecting tube group 240 arranged at both sides of the tube section 270 are shown in FIG. 3.

The coalescing filler in the coalescing tube 210 may be any one known in the art, such as granular filler, bundled filler, structured filler, or the like.

The primary treatment fluid experiences sufficient separation in the separating tube 220 based on the shallow-pool principle. Compared with the traditional shallow-pool oil-removing devices, such as slant plate oil-removing device, in the separating tube 220 the liquid surface is low and the liquid flows slowly, so that the liquid tends to be maintained as a laminar flow state, which is more conducive to upward floating of the oil droplets. Afterward, the floating oil droplets gradually enter the discharging tube 230 through second connecting tubes of the second connecting tube group 260. At the same time, the water further separated by natural laminar flow in the discharging pipe 230 may return to the separating pipe 220 by gravity through the second connecting tubes of the second connecting tube group 260.

In the laminar separator 200 according to the present invention, the low water-containing oil phase formed in the discharging tube 230 remains relatively independent from the low oil-containing water phase formed in the separating tube 220, thereby reducing the influence of hydraulic perturbations on the oil-water interface and significantly improving the oil-water separation efficiency.

As the primary treatment fluid flows in a laminar fashion in the separating tube 220, the separated oil phase will be progressively enriched in the discharging tube 230 via the second connecting tube group 260, and then discharged via the oil discharge pipeline 22. Meanwhile, the residual water phase will continue to flow along the separating tube 220 and finally enter the electric field separator 300 via a second pipeline 23, in order to receive a next stage of treatment. For the sake of clarity, only three tube sections 281, 282, 283 arranged between the separating tube 220 and the discharging tube 230, as well as three second connecting tubes 261, 262, 263 of the second connecting tube group 260 located adjacent to these tube sections are shown in FIG. 3.

According to a specific embodiment of the present invention, each of first connecting tubes of the first connecting tube group 240 and each of second connecting tubes of the second connecting tube group 260 are arranged along a flow direction of the oil-water mixture in a manner of being staggered with each other. As shown in FIG. 3, for example, the second connecting tube 261 is located between the first connecting tubes 241 and 242. With this arrangement, no short circuit will be formed between the first connecting tube group 240 and the second connecting tube group 260, so that the fluid entering the separating tube 220 must flow along the separating tube 220 for a certain distance before entering the discharging tube 230, and the water which is further separated in the discharging tube 230 must also flow along the discharging tube 230 for a certain distance before returning to the separating tube 220. At the same time, with this arrangement the hydraulic impact of the first connecting tube group 240 on the second connecting tube group 260 and the discharging tube 230 can be also reduced.

According to a specific embodiment of the present invention, the length of the coalescing tube 210 is 20%-100% of that of the separating tube 220, while the length of the discharging tube 230 is the same as that of the separating tube 220. According to a preferred embodiment of the present invention, the coalescing tube 210, the separating tube 220, and the discharging tube 230 are spirally arranged, and parallel to and spaced apart from each other, as schematically shown in FIG. 2. In this way, each ring of the spirally arranged laminar separator 200 constitutes an “elevated” oil-water separator, which has higher separation efficiency than a horizontally placed laminar separator. Due to the difference in density between the water phase and the oil phase, the water phase moves relatively downwards while the oil phase moves relatively upwards. According to the present invention, the outlet of the water phase of the entire laminar separator 200 is provided below the separating tube 220, while the outlet of the oil phase thereof is provided above the discharging tube 230. In this way, the oil content in the water phase below the separating pipe 220 is low, ensuring the water quality of the water phase discharged from the second pipeline 23, while the water content in the oil phase above the discharging pipe 230 is low, resulting in a low water content in the oil phase discharged from the oil discharge pipeline 22. In addition, with the coalescing tube 210, the separating tube 220 and the discharging tube 230 being arranged spirally along the vertical direction, the footprint of the laminar separator 200 is greatly reduced, which is advantageous to its installation.

According to the present invention, the electric field separator 300, the agent-adding separator 400 and the physical settler 500 of the oil-water mixture treatment unit 10 are formed into an integrated treatment unit 800, as shown in FIG. 4. This integrated treatment unit 800 consisting of the electric field separator 300, the agent-adding separator 400 and the physical settler 500 will be described in more detail below. It will be appreciated, however, that in an embodiment of the present invention not shown, the electric field separator 300, the agent-adding separator 400 and the physical settler 500 are arranged separately from one another, and are connected with each other in series.

As shown in FIG. 4, the secondary treatment fluid from the laminar separator 200 enters the electric field separator 300 of the integrated treatment unit 800 via the second pipeline 23. The integrated treatment unit 800 includes a cylindrical or square housing 810, wherein the electric field separator 300, the agent-adding separator 400 and the physical settler 500 are arranged at an upstream side, an intermediate side, and a downstream side of the housing 810, respectively, as shown. Specifically, a first partition 820 and a second partition 830 are provided in the housing 810, thereby dividing the housing 810 into three regions, i.e., a left region, a middle region and a right region in FIG. 4, in which the electric field separator 300, the agent-adding separator 400 and the physical settler 500 are arranged, respectively. It is readily understood that the heights of both the first partition 820 and the second partition 830 are lower than the heights of side walls of the housing 810. Moreover, the height of the first partition 820 is greater than that of the second partition 830.

A plurality of electrode plates 320 is provided in the electric field separator 300. These electrode plates are arranged parallel to and spaced apart from each other. Preferably, the spacing between two adjacent electrode plates 320 is, for example, 10-300 mm. These electrode plates 320 are arranged so that positive and negative electrode plates are placed alternately. The electrode plates 320 are connected by means of electrodes to a power supply and a control unit (not shown), so that the polarity of each electrode plate 320 and the amount of current flowing therethrough can be controlled.

According to the present invention, a carrier plate 350 is provided in the electric field separator 300, and connected to the housing 810 at one end and to the first partition 820 at the other end. In this way, the electrode plates 12 and their coalescing material 330 can be arranged on the carrier plate 350. A perforated water-distributing pipe 340 may also be provided under the carrier plate 350, so that the secondary treatment fluid from the second pipeline 23 can pass through the perforated water-distributing pipe 340 to the area of the electrode plates 320 upwardly.

In a preferred embodiment of the present invention, each electrode plate 320 is arranged inclined in a direction at an acute angle to a direction of flow of the oil-water mixture (i.e., the vertical direction from bottom to top). The angle of inclination may be, for example, 10-80 degrees. Since the electrode plates 320 are arranged in an inclined manner, they are capable of removing oil through inclined plates, in addition to providing an electric field.

The electrode plate 320 may be manufactured from inert materials, such as graphite plate, graphite paper, titanium plate, and the like. According to the present invention, the surface of the electrode plate 320 is modified. As shown in FIG. 5, the surface of the electrode plate 320 may be modified to have dot-like oleophilic zones 322, while the remaining zones are hydrophobically modified to form oleophobic zones 325. Studies have shown that agglomeration of oil droplets occurs mainly when oil droplets collide on the electrode plate. The effect of collision agglomeration of oil droplets on the oleophilic surface is superior to that on the hydrophobic surface. However, it is difficult for the oil droplets to be separated from the oleophilic surface. Therefore, according to the present invention, the electrode plate 320 is modified to have dot-like oleophilic zones 322. Accordingly, the agglomeration effect can be enhanced when oil droplets collide on the oleophilic zones 322. Then, the aggregated oil droplets contact the oleophilic zones 325, thus improving the separation effect and reducing the contamination of the electrode plate.

According to a specific embodiment of the present invention, each dot-like oleophilic zone 322 has a diameter of, for example, 1-50 mm, and the area of the dot-like oleophilic zones 322 accounts for 10%-50% of the total area of the electrode plate. This enables a good balance between agglomeration effect and separation effect.

In order to mitigate contamination of the electrode plate, the polarity of the electrode plate 320 can be changed periodically. This can be done automatically by means of a control unit (e.g. PLC) not shown. In a specific example, the polarity of the electrode plates 320 is changed at a period of 2-24 h.

According to the present invention, coalescing material 330 is filled between adjacent electrode plates. The coalescing material may be traditional granular filler, bundled filler, or structural filler having connecting channels between the positive and negative poles.

In a preferred embodiment, the coalescing material 330 may adopt a structure as shown in FIG. 6. As shown in FIG. 6, the coalescing material 330 located between two adjacent electrode plates 320 is in the form of a number of layers of plate-like coalescing material, i.e., coalescing plates 332, which are spaced apart from each other and extend substantially parallel to the electrode plates 320. The layers of coalescing plates 332 are connected to each other by a number of connecting rods 335, thus forming a unitary structure. As an example, FIG. 6 shows six layers of coalescing plates 332, from left to right, connected to each other by seven horizontally arranged connecting rods 335. Each layer of coalescing plate 332 is provided with a number of openings 333. Preferably, the openings 333 of the coalescing plate 332 in each layer are staggered with respect to the openings 333 of the coalescing plate 332 in the adjacent layer. The coalescing plate and the connecting rod can be preferably made of corrosion-resistant material, such as stainless steel, plastic or the like.

In this way, when emulsified oil droplets are subjected to an electric field force between the electrode plates 320, they move from a negative electrode plate (e.g., the left electrode plate 320 in FIG. 6) to a positive electrode plate (e.g., the right electrode plate 320 in FIG. 6). Agglomeration of the oil droplets occurs when they collide on the coalescing plates 332. The oil droplets after colliding and agglomerating on the first layer of coalescing plate 332 are subjected to the electric field force, entering the space between the first layer of coalescing plate and the second layer of coalescing plate through the openings 333 in the first layer of coalescing plate 332. Then, they continue to move towards the positive electrode plate under the action of the electric field force, and thus collide on the second layer of coalescing plate 332, and so on. Finally, the oil droplets float up to the liquid surface, completing the oil-liquid separation.

According to the present invention, the coalescing plates 332 divide the space between two electrode plates 320 into several layers, thus greatly reducing the transportation distance of oil droplets and increasing the chance of collision. At the same time, according to the shallow-pool theory, the efficiency of collision and agglomeration of oil droplets can be greatly improved.

For the granular filler and structural filler having vertical connecting channels, a backwash pipe 380 may be further provided according to the present invention, which extends in the electric field separator 300 to a center position above the electrode plates 320. The end of the backwash tube 380 is provided with a flaring outlet 370. Therefore, rinsing liquid can be sprayed onto the electrode plates 320 through the flaring outlet 370 of the backwash pipe 380, for cleaning the electrode plates. In addition, the second pipeline 23 and the perforated water-distributing pipe 340 may also function as a line for collecting the backwash wastewater.

After the treatment in the electric field separator 300, the sludge phase in the secondary treatment fluid is collected in a sludge collecting section 850 of the housing 810 located at the bottom of the electric field separator 300, and then discharged via a sludge discharge pipeline 24. The oil phase in the secondary treatment fluid is discharged via the oil discharge pipeline 22. The water phase in the secondary treatment fluid, as a tertiary treatment fluid, passes over the first partition 820 to enter the agent-adding separator 400, for the next stage of treatment.

In many cases, the secondary treatment fluid contains $Fe^{2+}$ and $S^{2-}$. After treated with the electric field, $Fe^{2+}$ is oxidized to $Fe^{3+}$ while $S^{2-}$ is oxidized to S monomer, resulting in an excessive concentration of suspended matter in the fluid. Therefore, it is necessary to remove the suspended matter. As shown in FIG. 4, the agent-adding separator 400 is arranged in the middle region of the housing 810 of the integrated treatment unit 800, and separated from the electric field separator 300 at an upstream side (i.e., the left side in FIG. 4) by the first partition 820 and from the physical settler 500 at a downstream side (i.e., the right side in FIG. 4) by the second partition 830.

According to the present invention, the agent-adding separator 400 comprises a third partition 840, thereby forming two distinct functional zones in the agent-adding separator 400, namely an upstream coagulation zone 420 and a downstream flocculation zone 430. An upper end of the third partition 840 is flush with the top of the integrated treatment unit 800, but a lower end thereof is not connected to the bottom of the housing 810, thereby allowing the coagulation zone 420 and the flocculation zone 430 are connected to each other at the bottom.

An agent-adding port 440 is provided in an upper portion of the coagulation zone 420, for adding agents such as NaOH, oxidizers, coagulants, coagulant aids, or the like, in order to remove constituents, such as iron, sulfur or the like, from the tertiary treatment fluid. As an example, NaOH can be added through the agent-adding port 440 to adjust the pH of the fluid to above 8 and remove $Fe^{2+}$. In another example, $S^{2-}$ can be removed by adding $H_2O_2$ through the agent-adding port 440. In addition, in some cases, say, when the content of the suspended matter is less than 25 mg/L, coagulant aids, such as PAM, clay or the like, can be added.

In addition, according to a specific embodiment of the present invention, a first group of folded plates 450 is provided in the coagulation zone 420 for hydraulic mixing. The first group of folded plates 450 is preferably mounted in the manner of heterogeneous folded plate, thus achieving a hydraulic residence time of less than 2 min and a G-value of 500-1000 $s^{-1}$. At the same time, a second group of folded plates 460 is provided in the flocculation zone 430 for hydraulic mixing. The second group of folded plates 460 is preferably mounted in the manner of homogeneous folded plate, thus achieving a hydraulic residence time of 10-30 min and a G-value of 10-75 $s^{-1}$.

In this way, the tertiary treatment fluid enters the coagulation zone 420 of the agent-adding separator 400 after passing over the first partition 820, and flows from top to bottom therein. The tertiary treatment fluid undergoes sufficient coagulation under the action of agents (e.g., NaOH, oxidizing agents, coagulants, coagulant aids, etc.) from the agent-adding port 440 and the first group of folded plates 450, and then enters the flocculation zone 430 through a passage formed below the third partition 840 and flows from bottom to top therein. Under the action of the second group of folded plates 460, the tertiary treatment fluid undergoes sufficient flocculation, and then passes over the second partition 830 to the physical settler 500, for the next stage of treatment.

It is readily understood that according to the present invention, the height of the second partition 830 is less than that of the first partition 820.

The physical settler 500 is arranged between the second partition 830 and the housing 810. The physical settler 500 includes a plurality of sloped plates 510 provided therein. In addition, the physical settler 500 may include an agent-adding port 540 above the second partition 830, for adding agents such as pH adjusters, corrosion inhibitors, scale inhibitors, and the like. For example, acid may be added through the agent-adding port 540 to adjust the pH of the alkali-added fluid to neutral. In this way, $Fe^{2+}$ in the quaternary treatment fluid forms $Fe(OH)_3$ flocs with suspended matter not removed in the agent-adding separator 400. The fluid undergoes settlement by means of the sloped plates 510, thereby removing the suspended matter from the quaternary treatment fluid. The quinary treatment fluid after treatment by the physical settler 500 is discharged through a third pipeline 25 arranged above the sloped plates 510.

According to the present invention, the housing 810 is further provided with sludge collection portions 860 and 870 located at the bottom of the agent-adding separator 400 and the physical settler 500, respectively. Accordingly, the sludge phases formed in the agent-adding separator 400 and the physical settler 500 can be collected at the sludge collection portions 860 and 870 respectively, and then discharged via the sludge discharge pipeline 24.

Further, according to the present invention, oil tanks 40, 41, 42 and 43 are arranged at side walls of the housing 810 of the integrated treatment unit 810, and at both side walls of the third partition 840, respectively, for collecting the separated oil phases. The separated oil phases may be discharged via the oil discharge pipeline 22 into a crude oil system for further treatment.

As shown in FIG. 1, the quinary treatment fluid from the physical settler 500 is discharged via the third pipeline 25 into a filter 600, where fine oil droplets and suspended matter are further removed. The senary treatment fluid treated by the filter 600 is discharged via a drain pipeline 90, as the final purified drain water.

As an optional example, a booster pump 610 may be provided on the third pipeline 25 such that the quinary treatment fluid is pressurized before entering the filter 600, in order to improve the filtration effect.

According to the present invention, the oil-containing wastewater passes through the cyclone separator 100, the laminar separator 200, the electric field separator 300, the agent-adding separator 400, the physical settler 500, and the filter 600 in the oil-water mixture treatment device 10 in sequence for a six-stage treatment. Eventually, the separated oil phase is discharged through the oil discharge pipeline 22 to enter the crude oil system for further treatment. The separated sludge phase is discharged through the sludge discharge pipeline 24. The purified water phase is discharged through the drain pipeline 90, the quality of which can meet the different requirements. Under ideal conditions, it can reach the following standards: the oil content is less than or equal to 5 mg/L, the suspended-solid content is less than or equal to 1 mg/L, and the median particle size of the suspended solids is less than or equal to 1 μm. The oil-water mixture treatment device 10 according to the present invention can be used, in particular, for treating the oilfield produced fluid and the oil-containing wastewater with an oil content of less than 40%.

According to the present invention, the electric field separator 300, the agent-adding separator 400 and the physical settler 500 of the oil-water mixture treatment device 10 are integrated in the housing 810 of the integrated treatment unit 800, enabling a very compact structure of the oil-water mixture treatment unit 10. At the same time, the fluid flow from the electric field separator 300 to the physical settler 500 via the agent-adding separator 400 only requires passing over corresponding partitions, with a short flow path. Thus, this integrated structure according to the present invention avoids complex piping connections and related contamination resulting therefrom, while reducing head loss and hydraulic lift.

It should be noted that although the oil-water mixture treatment device 10 described above comprises six parts, namely the cyclone separator 100, the laminar separator 200, the electric field separator 300, the agent-adding separator 400, the physical settler 500 and the filter 600, some of these parts may be omitted depending on the specific requirements. For example, if the oil-water mixture to be treated has a low oil concentration, the cyclone separator 100 may be omitted. If the oil-water mixture to be treated has a low content of $Fe^{2+}$, the agent-adding separator 400 may be unnecessary. And if the oil-water mixture to be treated has a low content of each of $Fe^{2+}$ and suspended matter, the agent-adding separator 400 and the physical settler 500 may be both omitted. If the quality requirement on the drain water is not high, the filter 600 may be omitted.

The treatment effect of the oil-water mixture treatment device 10 according to the present invention will be illustrated below based on several examples.

Example 1

The raw fluid is oil-containing wastewater from an oilfield produced fluid after preliminary treatment, which has an oil content of 50-250 mg/L and a suspended-matter concentration of 13-45.8 mg/L. An oil-water mixture treatment device comprising four parts, namely, the laminar separator 200, the electric field separator 300, the physical settler 500 and the filter 600, is adopted for the treatment. The electrode plate in the electric field separator 300 is made of graphite, and has an inclination angle of 10-45° and an spacing of 10-300 mm. Spherical coalescing material with a particle size of 3-20 mm is used. A voltage of 2-50 V and a current of 100-2000 A are applied to the electrode plate.

Measurements show that before treatment, the average oil content of the raw fluid was 140.5 mg/L, and the average concentration of suspended matter was 32.6 mg/L. After treatment by the oil-water mixture treatment device described above, the oil content of the drain water was 1.7 mg/L, and the concentration of suspended matter was 4.0 mg/L.

In addition, in Example 1 a study on periodically changing the polarity of the electrode plate was also conducted. In the treatment without polarity change of the electrode plate, the current of the electrode plate decreased to 48% of the initial current after 36 h of operation. In contrast, when the polarity of the electrode plate was changed, the current remained above 93.5% of the initial after 72 h of operation. Thus, it can be seen that periodically changing the polarity of the electrode plate can effectively reduce the contamination of the electrode plate.

Example 2

The raw fluid is an oilfield produced fluid, with an oil content of $8\times10^4$ mg/L to $40\times10^4$ mg/L. An oil-water mixture treatment device including six parts, i.e., the cyclone separator 100, the laminar separator 200, the electric field separator 300, the agent-adding separator 400, the physical settler 500, and the filter 600, is adopted for treatment. The remaining conditions are the same as in Example 1.

Measurements show that before treatment, the average oil content of the raw fluid was $18.7\times10^4$ mg/L. After treatment, the oil content of the drain water was 3.0 mg/L, and the concentration of suspended matter was less than 5 mg/L.

Example 3

The raw fluid is an oilfield produced fluid after preliminary treatment, with an oil content of 87.3 to 3,512.7 mg/L. An oil-water mixture treatment device including the laminar separator 200, the electric field separator 300, the physical settler 500, the filter 600 and an optional filter 600, is adopted for treatment. The remaining conditions are the same as in Example 1. The test was repeated 9 times.

Table 1 shows the oil content of the discharge water after each stage of treatment, and that relying only on gravity settlement without other treatment, in mg/L.

TABLE 1

| No. | Raw fluid | Laminar Separator | Electric field Separator | Physical settler | Filter | Standing for 20 min |
|---|---|---|---|---|---|---|
| 1 | 600.9 | 53 | 8.5 | 6.3 | 4.7 | 94.1 |
| 2 | 162.1 | 31.4 | 11 | 7.9 | 1.7 | 27.6 |
| 3 | 3512.7 | 69.8 | 2 | 1.6 | 1.2 | 48.8 |
| 4 | 87.3 | 26.7 | 10.2 | 7.7 | — | — |
| 5 | 241.6 | 35.5 | 11.7 | 10.8 | — | — |
| 6 | 195.2 | 33.4 | 12.4 | 8.1 | 4.5 | 28.4 |
| 7 | 266.1 | 34.9 | 15.3 | 12.6 | — | — |
| 8 | 115.5 | 27.8 | 3.6 | 0.9 | — | 22.7 |
| 9 | 103.4 | 24.9 | 0.8 | 0.9 | — | — |

As can be seen from Table 1, the parts that play a decisive role in reducing the oil content are the laminar separator 200 and the electric field separator 300. 93.2% to 99.9% of oil can be removed after these two stages of treatment.

Furthermore, after treated by the oil-water mixture treatment device according to the present invention, the oil content in the drain water is much lower than that in the water after gravity settlement alone.

Example 4

The raw fluid is an oilfield produced fluid after preliminary treatment, rich in $Fe^{2+}$, with a concentration of suspended solids of 13.0-57.8 mg/L. An oil-water mixture treatment device including the laminar separator 200, the electric field separator 300, the agent-adding separator 400 and the physical settler 500 is adopted for treatment. The remaining conditions are the same as in Example 1. The test was repeated 14 times.

The concentration of suspended solids in the discharge water is shown in Table 2, in mg/L.

TABLE 2

| No. | Raw fluid | Electric field Separator | Physical settler |
|---|---|---|---|
| 1 | 45.8 | 27.6 | 1.5 |
| 2 | 39.3 | 23.8 | 1.2 |
| 3 | 17.1 | 16.9 | 1.3 |
| 4 | 20.6 | 17.2 | 1.5 |
| 5 | 15.7 | 16.0 | 1.4 |

TABLE 2-continued

| No. | Raw fluid | Electric field Separator | Physical settler |
|---|---|---|---|
| 6 | 13.0 | 15.3 | 0.9 |
| 7 | 16.1 | 15.7 | 1.0 |
| 8 | 43.7 | 26.3 | 1.8 |
| 9 | 50.6 | 30.1 | 2.0 |
| 10 | 38.7 | 27.5 | 1.6 |
| 11 | 57.8 | 33.8 | 1.9 |
| 12 | 38.2 | 24.8 | 1.6 |
| 13 | 30.8 | 20.5 | 1.1 |
| 14 | 29.6 | 21.6 | 1.4 |
| Average | 32.6 | 22.7 | 1.4 |

In the discharge water from the electric field separator 300, part of the $Fe^{2+}$ is oxidized to $Fe^{3+}$ to generate fine suspended $Fe(OH)_3$ precipitates, resulting in the discharge water from the electric field separator 300 having a yellowish coloration and a high suspended solid content. A small amount of NaOH is added to the fluid in the agent-adding separator 400, and generation of flocs is observed immediately. The flocs are treated by the physical settler 500 and become clear.

Although the present invention has been described with reference to preferred embodiments, various improvements can be made and components thereof can be replaced with equivalents without departing from the scope of the present invention. In particular, each of the technical features mentioned in various embodiments may be combined in any manner as long as there is no structural conflict. The present invention is not limited to the particular embodiments disclosed herein, but includes all technical solutions falling within the scope of the claims.

The invention claimed is:

1. An oil-water mixture treatment device (10), comprising a laminar separator (200) and an electric field separator (300) located downstream of said laminar separator, wherein said laminar separator (200) comprises a coalescing tube (210) with coalescing filler therein, a separating tube (220) arranged above said coalescing tube, and a discharging tube (230) arranged above said separating tube;

wherein said coalescing tube, said separating tube and said discharging tube are arranged substantially parallel with and spaced apart from each other, said coalescing tube being connected to said separating tube by a first connecting tube group (240) and said separating tube being connected to said discharging tube by a second connecting tube group (260); and wherein, during operation, an oil-water mixture is treated in said coalescing tube, and then enters said separating tube through said first connecting tube group for laminar separation to form an oil phase and a water phase, and the oil phase enters into said discharging tube through said second connecting tube group and then is discharged from an upper portion of said discharging tube through an oil discharge pipeline (22), while the water phase enters into said electric field separator from a lower portion of said separating tube for a next stage of separation.

2. The oil-water mixture treatment device according to claim 1, characterized in that each first connecting tube in said first connecting tube group and each second connecting tube in said second connecting tube group are arranged with each other in a staggered manner along a flow direction of the oil-water mixture.

3. The oil-water mixture treatment device according to claim 1, characterized in that said coalescing tube, said separating tube and said discharging tube are all arranged in a spiral pattern, and a length of said coalescing tube is 20%-100% of that of said separating tube, and a length of said discharging tube is the same as that of said separating tube.

4. The oil-water mixture treatment device according to claim 1, characterized in that said electric field separator comprises a plurality of electrode plates (320) arranged substantially parallel with and spaced apart from each other, with a coalescing unit (330) disposed between two adjacent electrode plates, wherein said electrode plates (320) are arranged obliquely in a direction that is at an acute angle to the flow direction of the oil-water mixture.

5. The oil-water mixture treatment device according to claim 4, characterized in that a surface of each electrode plate comprises a number of dot-like oleophilic zones (322), and other parts of the surface of said electrode plate are oleophobic zones (325).

6. The oil-water mixture treatment device according to claim 5, characterized in that said dot-like oleophilic zones each have a diameter of 1-50 mm, and a total area of said dot-like oleophilic zones accounts for 10%-50% of an area of an entire electrode plate.

7. The oil-water mixture treatment device according to claim 4, characterized in that said coalescing unit comprises a plurality of coalescing plates (332) extending substantially parallel to said electrode plate, said coalescing plates being connected together to form a unitary body through a plurality of connecting rods (335).

8. The oil-water mixture treatment unit according to claim 7, characterized in that each coalescing plate is provided with a plurality of openings (333), each opening in each coalescing plate being staggered relative to openings in adjacent coalescing plates.

9. The oil-water mixture treatment device according to claim 4, characterized in that said electric field separator comprises a carrier plate (350), on which said electrode plates are provided, and a backwash pipe (380) is further provided above said electrode plates, and has an end provided with a flaring outlet (370) facing a center of said electrode plates.

10. The oil-water mixture treatment device according to claim 4, characterized in that said device further comprises an agent-adding separator (400) and a physical settler (500), wherein said electric field separator, said agent-adding separator and said physical settler are integrated in a housing (810), in which a first partition (820) and a second partition (830) are arranged to divide an internal space of said housing into three regions, so that said electric field separator, said agent-adding separator and said physical settler are arranged in said three regions, respectively.

11. The oil-water mixture treatment device according to claim 10, characterized in that said agent-adding separator is separated into an upstream coagulation zone (420) and a downstream flocculation zone (430) by means of a third partition (840), said coagulation zone and said flocculation zone being in communication with each other at a bottom of said agent-adding separator.

12. The oil-water mixture treatment device according to claim 11, characterized in that a pH value of the oil-water mixture is adjusted to above 8 by adding agent in said coagulation zone, wherein said agent contains coagulation aid for a content of suspended matter below 25 mg/L.

13. An oil-water mixture treatment device according to claim 11, characterized in that a first group of folded plates (450) is mounted in said coagulation zone in form of heterogeneous folded plate, and a second group of folded plates (460) is mounted in said flocculation zone in form of homogeneous folded plate.

14. The oil-water mixture treatment device according to claim 10, characterized in that said electric field separator, said agent-adding separator and said physical settler are each provided with a sludge collecting section at a bottom thereof and with an oil collecting tank at a top thereof.

15. The oil-water mixture treatment device according to claim 10, characterized in that said oil-water mixture treatment device further comprises a cyclone separator (100) provided upstream of said laminar separator, and a filter (600) provided downstream of said physical settler.

16. A method for treating an oil-water mixture using the oil-water mixture treatment device according to claim 10.

17. The method according to claim 16, characterized in that polarity of each electrode plate in said electric field separator is periodically changed with a period of 2-24 h.

18. The method according to claim 16, characterized in that the oil-water mixture to be treated is allowed to enter said laminar separator directly without passing through said cyclone separator when having an oil content less than 3,000 mg/L.

19. The method according to claim 16, characterized in that the oil-water mixture to be treated is allowed to enter said physical settler directly from said electric field separator when having a total content of iron less than 0.5 mg/L.

20. The method according to claim 16, characterized in that the oil-water mixture to be treated is allowed to enter said filter directly from said electric field separator when having a total content of iron less than 0.5 mg/L and a content of suspended matter less than 50 mg/L.

* * * * *